(12) United States Patent
Barth et al.

(10) Patent No.: US 8,497,782 B2
(45) Date of Patent: Jul. 30, 2013

(54) METHOD AND DEVICE FOR PLANNING A PATH WHEN PARKING A VEHICLE

(75) Inventors: Harald Barth, Korntal-Munchingen (DE); Nicolas Jecker, Esslingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 593 days.

(21) Appl. No.: 12/742,951

(22) PCT Filed: Nov. 5, 2008

(86) PCT No.: PCT/EP2008/009298
§ 371 (c)(1),
(2), (4) Date: May 14, 2010

(87) PCT Pub. No.: WO2009/065494
PCT Pub. Date: May 28, 2009

(65) Prior Publication Data
US 2010/0265103 A1 Oct. 21, 2010

(30) Foreign Application Priority Data
Nov. 20, 2007 (DE) .................. 10 2007 055 391

(51) Int. Cl.
*G08G 1/00* (2006.01)
(52) U.S. Cl.
USPC .............. 340/932; 340/435; 701/41; 180/204
(58) Field of Classification Search
USPC .......... 340/932.2, 435–437; 701/41; 180/204; 280/761
See application file for complete search history.

(56) References Cited

U.S. PATENT DOCUMENTS

| 4,931,930 | A  | * | 6/1990 | Shyu et al. | 701/36 |
| 6,825,880 | B2 | * | 11/2004 | Asahi et al. | 348/333.02 |
| 7,127,339 | B2 | * | 10/2006 | Iwazaki et al. | 701/36 |
| 7,308,345 | B2 | * | 12/2007 | Schmidt | 701/41 |
| 7,487,020 | B2 | * | 2/2009 | Iwazaki et al. | 701/41 |
| 7,737,866 | B2 | * | 6/2010 | Wu et al. | 340/932.2 |
| 8,065,058 | B2 | * | 11/2011 | Luke | 701/41 |

(Continued)

FOREIGN PATENT DOCUMENTS

| DE | 19922173 A1 * | 11/1999 |
| DE | 10 2005 006 966 A1 | 9/2005 |
| DE | 10 2005 028 956 A1 | 1/2007 |
| DE | 10 2005 058 809 A1 | 6/2007 |
| DE | 60 2004 002 224 T2 | 7/2007 |

(Continued)

OTHER PUBLICATIONS

International Search Report w/translation from PCT/EP2008/009298 dated Jan. 26, 2009 (4 pages)

*Primary Examiner* — Eric M Blount
(74) *Attorney, Agent, or Firm* — Osha Liang LLP

(57) ABSTRACT

A method and a device for planning a path when parking a vehicle (02) are described, in which a path (01) which comprises a first and second path arc (03; 04) is calculated on the basis of the geometry of a parking space (05) and a vehicle position relative to this parking space (05). According to the invention, at first a minimum appropriate first path arc (08) of the path (01) is calculated in order to reach a starting position as early as possible, and subsequently a possible larger first path arc (09) of the path (01) is preferably calculated as a function of an actual stopping position (13) of the vehicle (02). Furthermore, a driving assistance device for carrying out the method is described, as well as a computer program product which causes a microprocessor with associated storage means to carry out the method.

4 Claims, 1 Drawing Sheet

U.S. PATENT DOCUMENTS

| | | | |
|---|---|---|---|
| 2003/0122687 A1* | 7/2003 | Trajkovic et al. | 340/932.2 |
| 2005/0236201 A1* | 10/2005 | Spannheimer et al. | 180/204 |
| 2008/0252486 A1* | 10/2008 | Luke | 340/932.2 |
| 2008/0255728 A1* | 10/2008 | Ottenhues et al. | 701/41 |
| 2009/0085771 A1* | 4/2009 | Wu et al. | 340/932.2 |
| 2010/0066515 A1* | 3/2010 | Shimazaki et al. | 340/435 |

FOREIGN PATENT DOCUMENTS

| | | |
|---|---|---|
| FR | 2728859 A1 * | 7/1996 |
| WO | WO 2005085043 A1 * | 9/2005 |
| WO | 2006/069973 A1 | 7/2006 |
| WO | WO 2006069976 A2 * | 7/2006 |

* cited by examiner

METHOD AND DEVICE FOR PLANNING A PATH WHEN PARKING A VEHICLE

PRIOR ART

The invention relates to a method for planning a path when parking a vehicle according to the preamble of claim 1, a driving assistance device and a computer program for carrying out the method.

Known driving assistance devices for assisting a driver of a vehicle when parking, referred to below for short as parking systems, calculate a path for parking the vehicle or a parking path at the start or before the start of a parking process. This path is calculated on the basis of the geometry of a parking space and a vehicle position relative to this parking space. Further input variables are not taken into account there, which leads to a contradiction between the wish for the earliest possible starting position for the parking process associated with a small first path arc, and a parking process which is as comfortable as possible, associated with a small steering lock and a small amount of lateral veering towards the opposite side. This results in the further disadvantage of determining in advance, independently of a surrounding situation, whether the earliest possible starting position or a parking process which is as comfortable as possible is weighted higher when the path parameters are determined.

For example DE 60 2004 002 224 T2 discloses a parking assistance device for parking vehicles, in which device information data relating to obstacles or parking surface boundaries are acquired by means of a camera in the rear part of the vehicle. For this purpose, a parking space framework, which is determined by means of an image evaluation, is superimposed on an image of the surroundings behind the vehicle on a display in the vehicle. The vehicle is controlled by means of an electronic parking assistance control unit with control of the steering, acceleration and braking processes.

Furthermore, for example DE 10 2005 028 956 A1 discloses an assistance system for parking vehicles in which information data relating to obstacles or parking surface boundaries are acquired with ultrasonic sensors on the vehicle which is to be parked.

DISCLOSURE OF THE INVENTION

The invention is based on a method for planning a path when parking a vehicle, in which a path which comprises a first and second path arc is calculated on the basis of the geometry of a parking space and a vehicle position relative to this parking space, wherein it is considered an object of the invention to develop the method for planning a path further to the effect that additional input variables can be taken into account in order to be able to adapt the parking path to the situation even better and to resolve better contradictions between various requirements.

The disadvantages of the prior art are avoided in a method according to the invention for planning a path when parking a vehicle in that the path for the parking of the vehicle is advantageously firstly calculated with a minimum appropriate first path arc and is then calculated with a possible larger first path arc.

Since the curvature of the first path arc influences directly the location of a starting position in the longitudinal direction for the lateral parking, calculating the minimum appropriate first path arc makes it possible to reach the starting position as early as possible.

If the driver stops the vehicle later in the longitudinal direction, the path is preferably newly calculated as a function of an actual stopping position of the vehicle with a larger first path arc which is then possible. A parking process of the vehicle then preferably takes place along the path with the larger possible first path arc. As a result, the parking process requires a smaller steering lock, and the vehicle swings out less to the side, in particular when parking in reverse, and the course of the parking process is therefore more comfortable for the driver.

The invention therefore particularly advantageously permits an optimum possible path for the parking of a vehicle into a parking space to be determined.

The invention can be advantageously applied in particular in conjunction with a driving assistance device for assisting a driver of a vehicle when parking into a parking space. Such a driving assistance device preferably comprises means for detecting a parking space and a starting position of a parking process relative to this parking space, and a microprocessor which is connected to the means and has associated storage means for calculating a path which comprises a first and second path arc at first with a minimum appropriate first path arc of the path and subsequently with a possible larger first path arc of the path as a function of an actual stopping position of the vehicle.

An advantageous application of the method according to the invention is obtained in conjunction with a driving assistance device which permits guided parking or semi-automatic parking, or fully automatic parking.

One particularly advantageous embodiment of the invention relates to a computer program product stored on a computer-useable medium, comprising computer-readable programming means which, when the computer program product is executed on a microprocessor with associated storage means or on a computer, cause the latter to carry out a method according to the invention as described above.

BRIEF DESCRIPTION OF THE DRAWING

The invention will be explained in more detail below with reference to the figures, of which.

WAYS OF CARRYING OUT THE INVENTION

Figure 1:
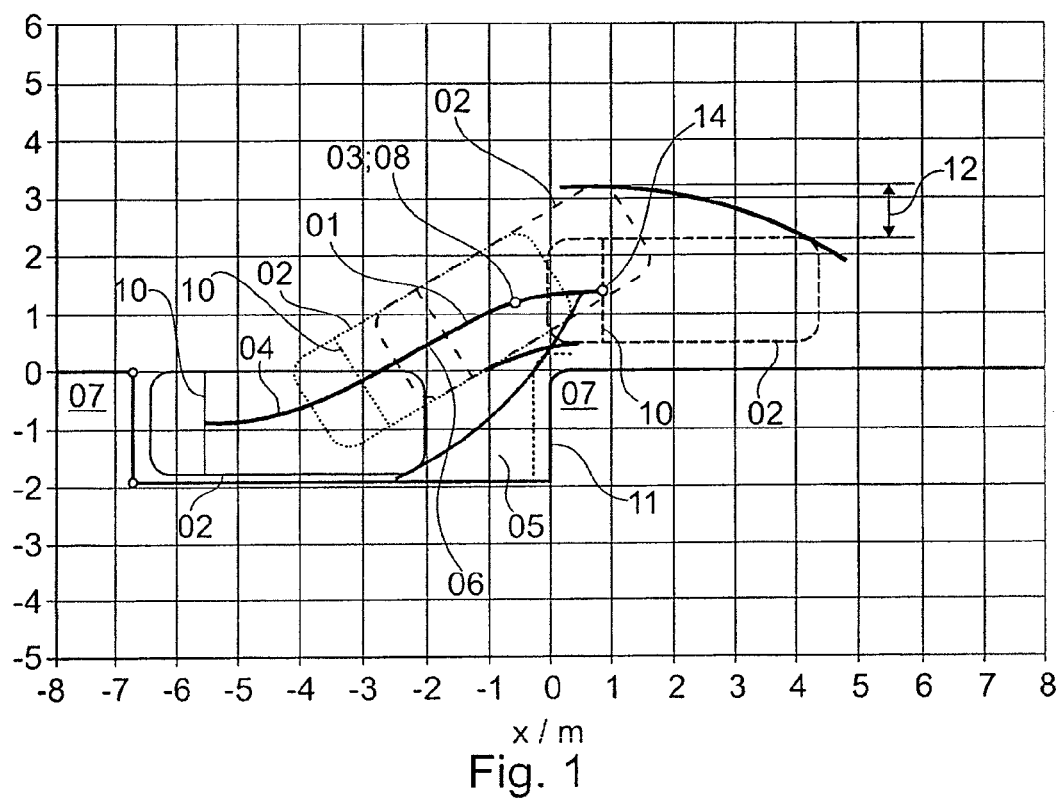
FIG. 1 is a schematic illustration of a single-movement parking process with the minimum appropriate first path arc into a lateral parking space.

A path 01 (illustrated in FIGS. 1 and 2) for parking a vehicle 02 into a lateral parking space 05 is composed, in an illustrated single-movement parking process, of a first path arc 03, a second path arc 04 and a straight section 06 lying between the latter and also referred to as a straight oblique phase. The lateral parking space 05 is bounded, for example, by vehicles 07 which are parked at the edge of the road and are not illustrated in more detail. The lateral distance between the parking vehicle 02 and the parked vehicles 07 is 0.5 m in the exemplary embodiment. The oblique position of the vehicle during the parking process is identical here in FIGS. 1 and 2, as are the radius and the curvature of the second path arc 04.

When the parking space 05 is detected by suitable surrounding sensors, for example ultrasonic sensors on the front of the vehicle, on the rear of the vehicle and, if appropriate, on the side of the vehicle 02, and, for example, below a predefinable threshold value for the vehicle speed, a driving assistance device which carries out the method according to the invention, has suitable means for carrying out the method and is installed in the vehicle 02, firstly calculates the minimum appropriate first path arc 08 of the path 01 (illustrated in FIG. 1). The minimum appropriate path arc 08 is bounded, for example, by the maximum steering lock and the dimensions of the vehicle 02. As illustrated in FIG. 1, the exemplary embodiment has a minimum first path arc 08 with a radius of 4.8 m which virtually corresponds to a full lock, a starting position 14, which corresponds to an earliest possible stopping position 14 and is at a distance of 0.83 m between the rear axle 10 of the vehicle 02 and the end 11 of the parking space 05, and a veering-out width 12 of 0.87 m. Since the curvature of the first path arc 03 directly influences the location of a starting position in the longitudinal direction for the lateral parking, calculation of the minimum appropriate first path arc 08 causes the starting position 14 to be reached as early as possible.

Figure 2:
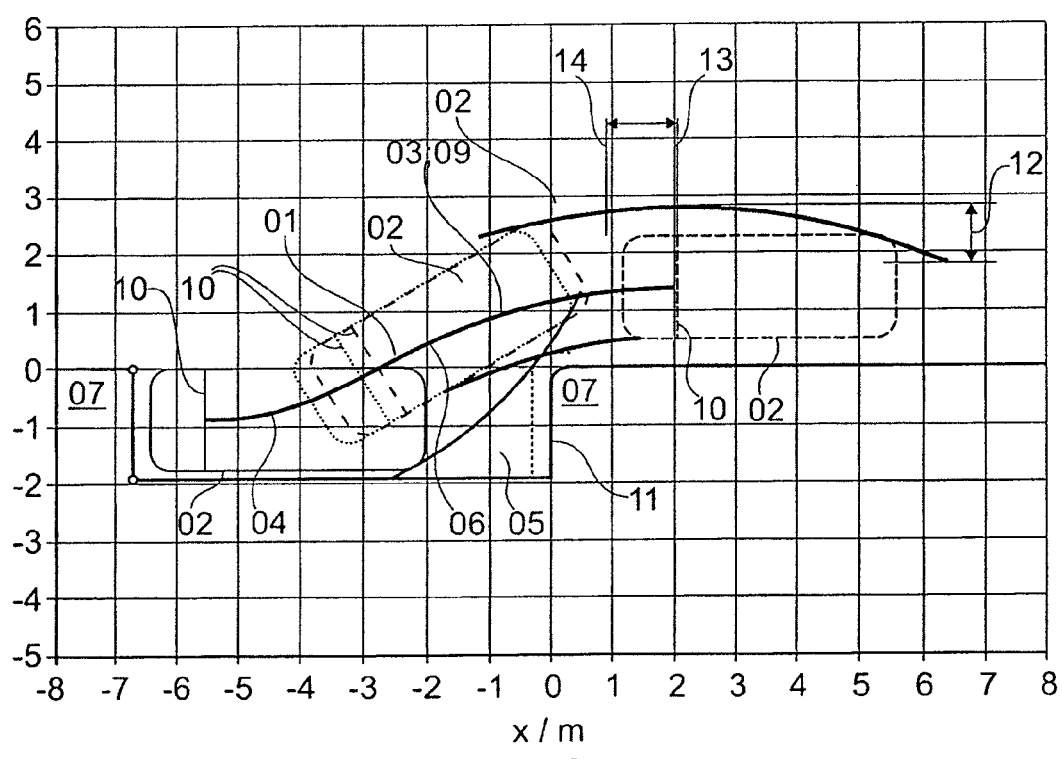
FIG. 2 is a schematic illustration of a single-movement parking process with a possible larger first path arc into a lateral parking space.

A possible larger first path arc 09 is then preferably calculated as a function of the actual stopping position 13 of the vehicle 02 which is illustrated in FIG. 2. The parking process then preferably proceeds along the path 01 with the possible larger first path arc 09. This ensures that the parking process requires a smaller steering lock and the vehicle 02 swings out less to the side, in particular in the case of reverse parking, and the course of the parking process is therefore more comfortable for the driver. As illustrated in FIG. 2, the exemplary embodiment has a possible larger first path arc 09 with a radius of 9.0 m, which requires a small steering lock, a starting position 13 which corresponds to the actual stopping position 13, or the later stopping position 13 compared to the earliest possible stopping position 14 (FIG. 1), with a distance of 2.04 m between the rear axle 10 of the vehicle 02 and the end 11 of the parking space 05, as well as a veering-out width 12 of 0.48 m.

The invention therefore permits an optimum possible path 01 for the parking of a vehicle 02 into a parking space 05 to be determined.

The invention claimed is:

1. A method for planning a path when parking a vehicle, comprising:
   calculating the path comprising a first and second path arc on the basis of a geometry of a parking space and a vehicle position relative to the parking space,
   wherein, at first, a minimum appropriate first path arc of the path is calculated, in order to reach the starting position as early as possible, where the first path arc of the path virtually corresponds to a full lock of the steering, subsequently, as a function of an actual stopping position of the vehicle, a possible larger first path arc of the path is calculated which requires a smaller steering lock, whereby a parking process of the vehicle is carried out along the path with the larger possible first path arc.

2. A driving assistance device, comprising:
   means for detecting a parking space and a starting position of a parking process of a vehicle relative to the parking space; and
   a microprocessor operatively connected to the means and comprising storage means for calculating a path comprising a first and second path arc
   wherein, at first, a minimum appropriate first path arc of the path is calculated, in order to reach the starting position as early as possible, where the first path arc of the path virtually corresponds to a full lock of the steering, subsequently, as a function of an actual stopping position of the vehicle, a possible larger first path arc of the path is calculated which requires a smaller steering lock, whereby a parking process of the vehicle is carried out along the path with the larger possible first path arc.

3. The driving assistance device according to claim 2, wherein the driving assistance device permits one of guided parking, semi-automatic parking, or fully automatic parking.

4. A computer program product stored on a computer-useable medium, comprising computer-readable programming instructions which, when the computer program product is executed on a microprocessor with associated storage means or on a computer, cause the computer program product to carry out a method comprising:
   calculating the path comprising a first and second path arc on the basis of a geometry of a parking space and a vehicle position relative to the parking space,
   wherein, at first, a minimum appropriate first path arc of the path is calculated, in order to reach the starting position as early as possible, where the first path arc of the path virtually corresponds to a full lock of the steering, subsequently, as a function of an actual stopping position of the vehicle, a possible larger first path arc of the path is calculated which requires a smaller steering lock, whereby a parking process of the vehicle is carried out along the path with the larger possible first path arc.

* * * * *